US006542296B2

(12) United States Patent
Lee et al.

(10) Patent No.: US 6,542,296 B2
(45) Date of Patent: Apr. 1, 2003

(54) BACK-LIGHTED AUTOSTEREOSCOPIC DISPLAY

(75) Inventors: Kuen Lee, Hsinchu (TW); Chao-Hsu Tsai, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 168 days.

(21) Appl. No.: 09/745,351

(22) Filed: Dec. 21, 2000

(65) Prior Publication Data

US 2001/0005284 A1 Jun. 28, 2001

(30) Foreign Application Priority Data

Dec. 24, 1999 (TW) ........................................ 88122888 A

(51) Int. Cl.[7] .............................................. G02B 27/22
(52) U.S. Cl. ........................................ 359/462; 359/464
(58) Field of Search ............................ 359/619, 462, 359/464, 626

(56) References Cited

U.S. PATENT DOCUMENTS

| 4,649,425 A | * | 3/1987 | Pund ............................ 358/88 |
| 5,327,285 A | | 7/1994 | Faris ........................... 359/483 |
| 5,572,251 A | * | 11/1996 | Ogawa ......................... 348/207 |
| 5,680,171 A | * | 10/1997 | Lo et al. ....................... 348/42 |
| 5,712,732 A | * | 1/1998 | Street .......................... 359/630 |
| 5,801,811 A | * | 9/1998 | Lo et al. ....................... 355/22 |
| 5,808,792 A | * | 9/1998 | Woodgate et al. ........... 359/463 |
| 5,844,717 A | | 12/1998 | Faris |
| 6,008,484 A | * | 12/1999 | Woodgate et al. ........... 359/458 |

* cited by examiner

Primary Examiner—Ricky Mack
Assistant Examiner—Brandi M Thomas
(74) Attorney, Agent, or Firm—J.C. Patents

(57) ABSTRACT

A back-lighted autostereoscopic display. A uniform light is emitted from a plane light source. A polarization plate is disposed in front of the plane light source to polarize the uniform light into a polarized light. A micro-moving window device is disposed in front of the polarization plate to selectively change the polarity of the polarized light into another type of polarization. A micro-optical device is located in front of the micro-moving window device, thereby both the polarized light changed and unchanged pass through the micro-optical device to travel further. An imaging apparatus is located in front of the micro-optical device, so that the lights are converged into the eyes of an observer. A liquid crystal display panel with a patterned half-wavelength phase retarder according to the even rows and odd rows of the interlaced image displayed on the liquid crystal display is located in front of the imaging apparatus to project the stereo-image to the observer.

20 Claims, 3 Drawing Sheets

BACK-LIGHTED AUTOSTEREOSCOPIC DISPLAY

CROSS-REFERENCE TO RELATED APPLICATION

This application claims the priority benefit of Taiwan application serial no. 88122888, filed Dec. 24, 1999.

BACKGROUND OF THE INVENTION

1. Field of the Invention

The invention relates to a back-lighted autostereoscopic display, and more particular, to a back-lighted autostereoscopic display with a very light weight and very thin dimension having a micro lens array.

2. Description of the Related Art

In a conventional three-dimensional display, an alternative array of thin stripes with different polarization states can be aligned to a liquid crystal display panel with interlaced parallax images to display stereoscopic images. For example, a micro-polarizer is shown in FIG. 1A to FIG. 1C, which is disclosed in U.S. Pat. No. 5,327,285 and U.S. Pat. No. 5,844,717. For an observer to see a three-dimensional image, the left eye and the right eye are to receive the lights with different polarization. Therefore, two polarization plates 102 and 104 with polarization types perpendicular to each other are laminated as shown in FIG. 1A to FIG. 1B. The laminated plate 106 thus comprises the first polarization type areas and the second polarization type areas, and the polarization directions 112 are alternating with each other as shown.

As shown in FIG. 1C, with the laminated polarization plate 106 coupled to the liquid crystal display panel 108, an observer can observe a three dimensional image only by wearing a pair of polarization glasses 110. This is not convenient and natural to the observer, and sometimes induces headache or giddiness. In addition, the stereoscopic effect will get worse while the size of the display area becomes larger.

For the convenience of the viewer(s), the system that enables the observers to see three-dimensional images without wearing the polarization glasses has been developed. FIG. 2 shows a stereoscopic display of projection type that enables the observers to see a three-dimensional image without wearing a pair of polarization glasses. As shown in FIG. 2, the projection type stereoscopic display consists of a light source 202, a polarization switching apparatus 204, a Fresnel lens 206 and a micro-polarized liquid crystal display 208. Lights from the light source 202 are polarized into a first type polarization and a second type of polarization by the polarization switching apparatus 204 in front of the light source 202. The micro-polarized liquid crystal display 208 is located in front of the light source 202, and the polarization apparatus 204 is between the micro-polarized liquid crystal display 208 and the light source 202. The Fresnel lens 206 is located between the polarization apparatus 204 and the micro-polarized liquid crystal display 208 (a combination of liquid crystal display 108 showing interlaced parallax images and laminated polarization plate 106 in FIG. 1C). Through the Fresnel lens 206, the observer 210 is able to see the stereoscopic images with naked eyes from the projection type stereoscopic display, However, this light projection structure is still in a large dimension and with a heavy weight and is hard to meet the commercial requirements.

SUMMARY OF THE INVENTION

A back-lighted autostereoscopic display is provided by the invention. A uniform light is emitted from a plane light source. A polarization plate is disposed in front of the plane light source to polarize the uniform light into a polarized light. An array of micro-moving window elements is disposed in front of the polarization plate to selectively change the polarity of the polarized light into another type of polarization. An array of micro-lens is located in front of the array of micro-moving window elements, thereby both the polarized light changed and unchanged pass through the array of micro-moving window elements to travel further. An imaging apparatus is located in front of the array of micro-lens, so that the lights are converged into the eyes of an observer. A liquid crystal display panel is located in front of the imaging apparatus to project the stereo-image to the observer.

The autostereoscopic display comprises further a tracking system to monitor the head position of the observer. Therefore, the lights with different polarization through the micro-moving windows and the areas outside the micro-moving windows can be thus projected into different eye of the observer respectively to obtain the stereo effect.

Thus constructed, the invention provides an apparatus as a back light source system for a liquid crystal display. The apparatus comprises the plane light source, the array of micro-moving window elements and the array micro-lens. The utilization of arrays of micro-moving window elements and the micro-lens save a great deal of space of the liquid crystal display. Therefore, the liquid crystal display can be formed very light in weight with a thin dimension. Furthermore, since all the light emitted from the plane light source, being polarized for once or several times, is to be projected to the observer. Therefore, the light intensity is higher than the conventional display system. And the area for image display can be enlarged to achieve the flat display of large display area.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of the specification, illustrate an embodiment of the invention and together with the description, serve to explain the principles of the invention. In the drawings.

DESCRIPTION OF THE PREFERRED EMBODIMENTS

Figure 3:
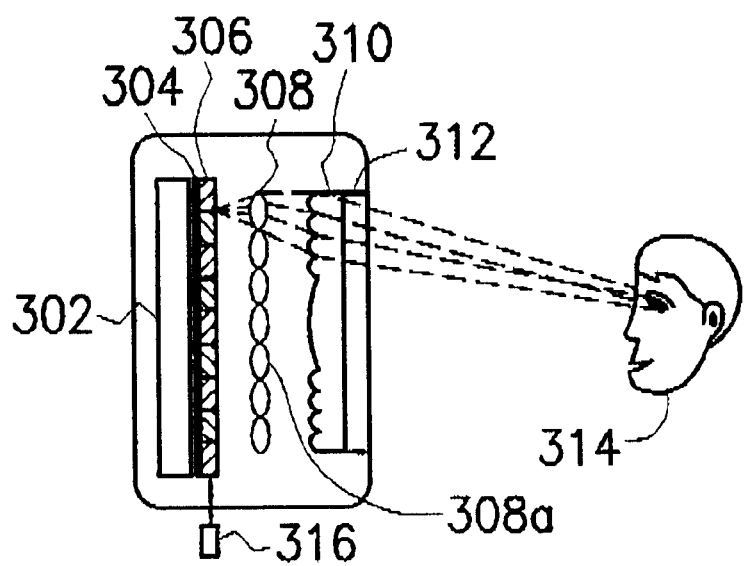
FIG. 3 shows an autostereoscopic display according to the invention.

FIG. 3 shows an advanced design that provides the stereo effects in a lightweight and a very thin dimension. A back lighted type is used in this design. In FIG. 3, a back lighted autostereoscopic display is shown. The display comprises a back light providing apparatus including a plane light source 302, a polarization apparatus 304, a micro-moving window device 306, a micro-optical device 308, imaging apparatus 310, and a liquid crystal display panel 312. A uniform light, preferably plane white light beams, is emitted from the plane light source 302, such as a lamp with a light diffusing plate or a point light source array of white light emitting diodes. In front of the plane light source 302, a polarization apparatus 304, such as a polarization plate, is disposed. The polarization apparatus 304 polarizes the uniform but random polarized light into linear polarization.

A micro-moving window device 306 is located in front of the polarization apparatus 304. The micro-moving window device 306, for example, can be made by cutting a moving window liquid crystal display into many micro-liquid crystal display elements in a matrix form or a vertical stripe form.

Figure 4A:
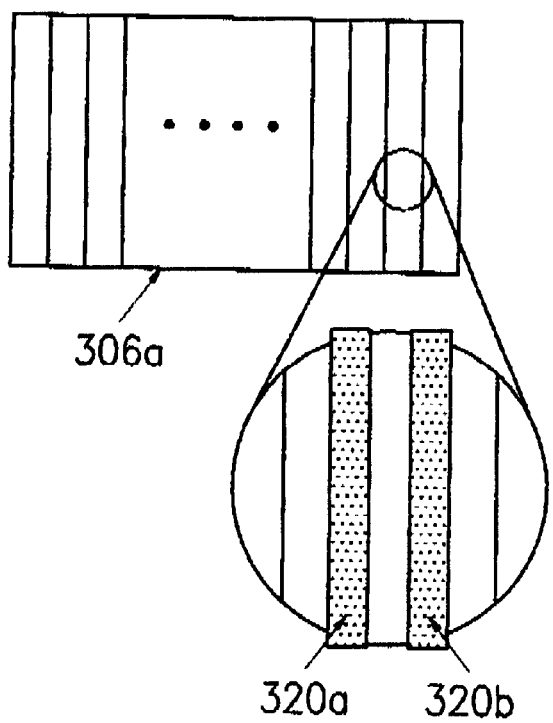
FIG. 4A and FIG. 4B shows the different types of the micro-moving window device in the autostereoscopic display according to the invention.
Figure 4B:
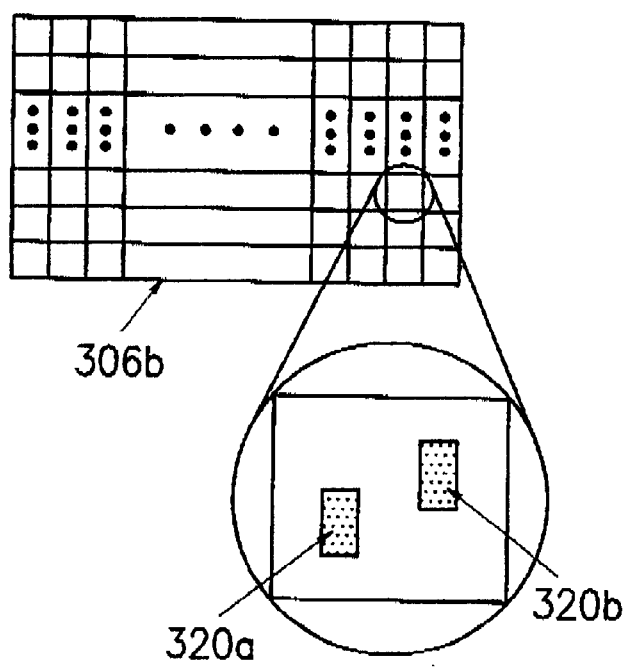

FIG. 4A and FIG. 4B show the micro-moving window devices of stripe type and matrix type. The micro-moving window device comprises multiple micro-moving window elements 306a of stripe type in FIG. 4A, and it comprises multiple micro-moving window elements 306b of matrix type in FIG. 4B, respectively. The micro-moving window elements 306a and 306b are spaced with each other as shown in FIG. 4A and FIG. 4D separately. A micro-moving window 320a or 320b is opened in each of the micro-moving window elements 306a or 306b corresponding to one observer. If there are many observers, a plurality of micro-moving windows 320a, 320b and more are opened in each of the micro-moving window elements 306a or 306b corresponding to the lateral positions of these observers respectively, and the micro-moving windows are controlled by the peripheral driving circuit.

In front of the micro-moving window device 306, a micro-optical device 308 is so disposed that the micro-optical device 308 has a focal length right positioned at where the micro-moving windows device 306 located. The micro-optical device 308 comprises a number of micro-lenses 308a in one-dimensional array or two-dimensional array corresponding to the micro-moving window elements 306a or 306b in the micro-moving window device 306. The number of micro-lenses 308a is equal to the number of the micro-moving window elements in micro-moving window device 306. Preferably, for each micro-moving element 308a, there located a micro-lens 308a aligned therewith and the size is corresponding to each other.

In front of the micro-optical device 308, an imaging apparatus 310 is provided. The imaging apparatus 310 can be made by a holographic optical element (HOE) or a large area lens such as a Fresnel lens. The lights passing through the imaging device 310 are converged to the eyes of the observer. In front of the imaging device 310, a liquid crystal display panel 312 is provided. The liquid crystal panel 312 includes a micro-polarized liquid crystal display panel such as a liquid crystal display panel with a micro-retarder or a micro-polarizer. Therefore there are many areas with different polarization types in the liquid crystal display panel 312. Using the micro-retarder; the observer does not require a pair of polarization glasses to see the three-dimensional images.

The lights, such as white light, from the light source 302 passing through the polarization apparatus 304 and the micro-moving window device 306 have different polarization types in different areas. In fact, the lights passing through the micro-moving windows 320a and 320b have a polarization type perpendicular to the lights through the area outside the micro-moving windows 320a and 320b in the micro-moving window elements 306a and 306b.

On one hand, the lights through the micro-moving windows 320a and 320b are converged to one eye of the observer, such as the left eye of the observer, by way of the imaging apparatus 310, wherein the lights go through the micro-moving window device 306 and the micro-optical device 308. On the other hand, the lights through the areas outside the micro-moving windows 320a and 320b in micro-moving window elements 306a and 306b are converged to the region other than the former eye of the observer by the imaging apparatus 310. The region other than the former eye of the observer mentioned above includes the other eye of the observer, such as the right eye of the observer.

The images for left and right eye vision are alternately displayed on different areas of the liquid crystal display panel 312 corresponding to the areas with different polarization types. Then the images on the liquid crystal display panel 312 are projected to the left and right eye of the observer respectively, as the lights passing the liquid crystal display panel 312. For example, the images displayed on the P-type and S-type polarized areas are projected onto the left and right eye of the observer respectively. In this manner, two lights with different polarization types are to project onto different eyes of the observer, so that a stereo effect can be achieve. In addition, the micro-moving window device 306 may be coupled to a tracking system 316, for example, a charge-coupled device (CCD), to monitor and analyze the eye position of the observer. As the head position of the observer changed, the micro-moving windows 320a and 320b in the micro-moving window elements 306a and 306b, controlled by the tracking system 316, move with the eye position of the observer relatively. Therefore, the light can be projected onto the eyes of the observer precisely even though the observer moves.

The back-lighted autostereoscopic display according to the invention can be adapted to an autostereoscopic display for multiple observers. All the components of the autostereoscopic display for multiple observers are the same as described above. But the number of the micro-moving windows in each micro-moving window element is equal to the number of the observers, and each micro-moving window in a micro-moving window element is corresponding to one of the observers. In this manner, more than one observer can observe a stereo image from the display simultaneously.

Figure 1A:
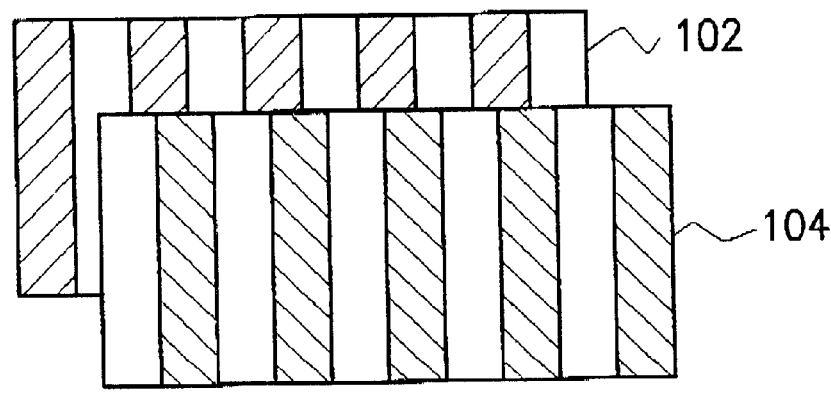
FIG. 1A to FIG. 1C show a micro-polarizer used in a conventional stereoscopic display.
Figure 1B:
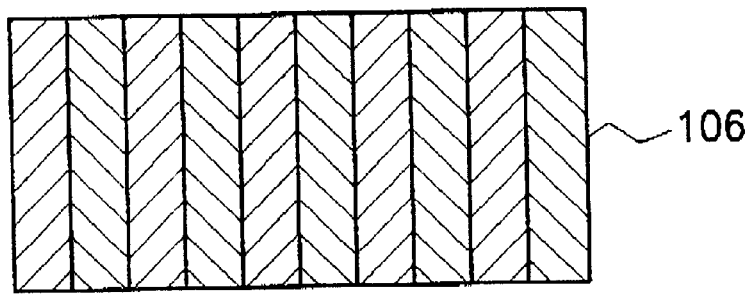
Figure 1C:
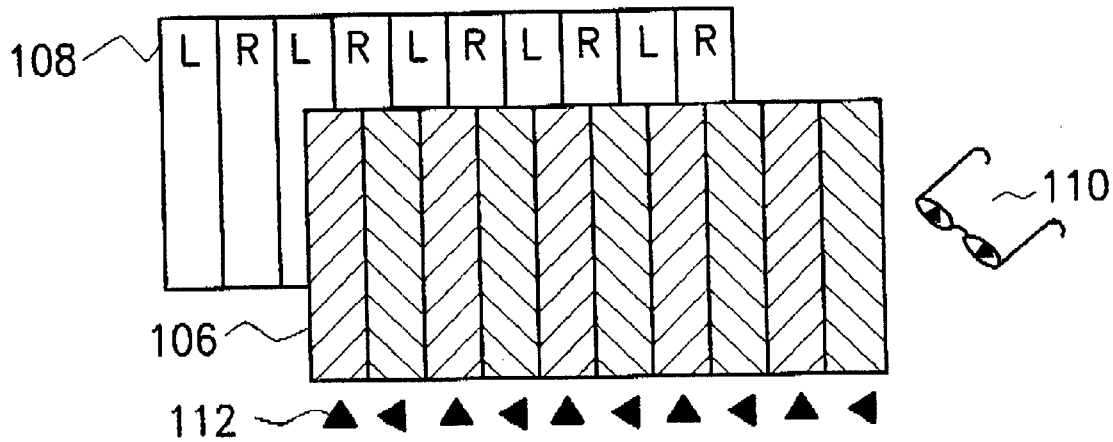
Figure 2:
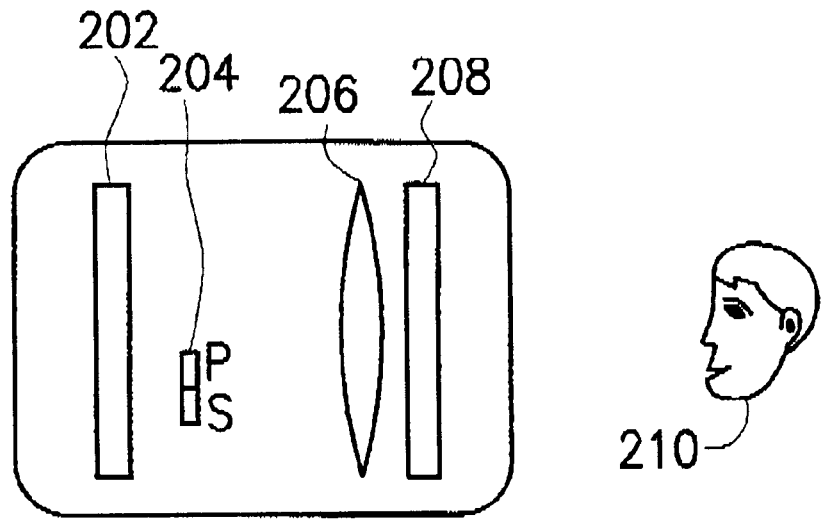
FIG. 2 shows a stereoscopic display enabling an observer to see a three-dimensional image without wearing a pair of polarization glasses.

Since the micro-optical device 308 can be made in a very light weight, so that the whole display can be made in a very light weight. In addition, since the volume of each micro-lens 308a is much smaller compared to the single lens used as shown in FIG. 2, each micro-lens 308a possesses a thin thickness and a large radius of curvature, so that the thickness of the display can be farther reduced. Owing to the short focal length of the micro-lens, the optical effect of the micro-lenses is the same as a single large area lens and the optical path of the display can be also further shortened, so as to reduce the thickness and the weight of the autostereoscopic display.

Other embodiment of the invention will appear to those skilled in the art from consideration of the specification and practice of the invention disclosed herein. It is intended that the specification and examples to be considered as exemplary only, with a true scope and spirit of the invention being indicated by the following claims.

What is claimed is:

1. A back-lighted autostereoscopic display, comprising:
  a light source;
  a micro-moving window device, in front of the light source and comprising a plurality of micro-moving window elements, wherein each micro-moving window element further comprising at least one micro-moving window;

a micro-optical device, in front of the micro-moving window device and comprising a plurality of micro-lens, wherein an amount of the micro-lenses is the same as an amount of the micro-moving window elements, and each of the micro-moving window elements is aligned with a micro-lens;

a imaging apparatus in front of the micro-optical device; and a liquid crystal display panel in front of the imaging apparatus, the area of the display panel can be covered by the imaging apparatus.

2. The display according to claim 1, wherein the micro-moving window device is located on a focal plane of the array of micro-lenses.

3. The display according to claim 1, comprising further a tracking system coupled to the micro-moving window device.

4. The display according to claim 1, comprising further a charge-coupled device as a tracking system coupled to the micro-moving window device to monitor at least one observer.

5. The display according to claim 1, wherein the micro-moving window device comprises a liquid crystal display.

6. The display according to claim 1, wherein the micro-lens comprises a lenticular lens array.

7. The display according to claim 1, wherein the liquid crystal display panel comprises a liquid crystal display panel with a micro-retarder.

8. The display according to claim 1, wherein the micro-moving window device is coupled to a tracking system, so as to project lights onto a left eye and a right eye of an observer with different polarization.

9. An apparatus for providing a back light with stereo effect for a liquid crystal display panel, the apparatus comprising:

a light source, a uniform light emitted from the plane light source;

a micro-moving window device, in front of the light source and coupled with a tracking system to selectively change polarity of the uniform light emitted from the light source, wherein the micro-moving window device comprising a plurality of micro-moving window elements; and an array of micro-lens, of which a focal plane is at which the micro-moving window device located, wherein an amount of the micro-lenses is the same as an amount of the micro-moving window elements, and each of the micro-moving window elements is aligned with a micro-lens.

10. The apparatus according to claim 9, wherein the micro-moving window device comprises a liquid crystal display.

11. The apparatus according to claim 9, wherein the micro-lenses comprise lenticular lenses array.

12. The apparatus according to claim 9, wherein the lights travelling through the array of micro-lens are then converged to left and right eyes of an observer by an imaging apparatus.

13. The apparatus according to claim 9, wherein a liquid crystal panel with a micro-retarder is located between the imaging apparatus and the observer.

14. An apparatus to provide a stereo-image for a liquid crystal display, the apparatus comprising;

a light source, to emit a uniform plane light;

a micro-moving window device in a plurality of micro-moving window elements, wherein each micro-moving window element further comprising at least one micro-moving window, the light passing through the micro-moving windows is the first type polarized light, and is converted into a second polarized type light passing through positions of the micro-moving window elements other than the micro-moving windows; and a plurality of micro-lens, having a focal plane at which the micro-moving window device is located, wherein an amount of the micro-lenses is the same as an amount of the micro-moving window elements, and each of the micro-moving window elements is aligned with a micro-lens.

15. The apparatus according to claim 14, wherein the micro-moving window device is further coupled to a tracking system.

16. The apparatus according to claim 14, wherein the micro-moving window device comprises a liquid crystal display panel.

17. The apparatus according to claim 14, wherein the micro-lenses comprise lenticular lenses array.

18. The apparatus according to claim 14, wherein the liquid crystal display further comprises:

an imaging apparatus with an area large enough to cover all the first and second type of polarized lights passing through the micro-lens and the following liquid crystal display panel; and a liquid crystal panel with a micro-retarder to provide a phase retardation for an observer without using a pair of polarization glasses.

19. The apparatus according to claim 18, wherein the imaging apparatus comprises a Fresnel lens or a conventional convex lens.

20. The apparatus according to claim 18, wherein the imaging apparatus comprises a holographic optical element.

* * * * *